United States Patent [19]

Rainer

[11] Patent Number: 5,002,984

[45] Date of Patent: Mar. 26, 1991

[54] PRODUCT FOR THE ABSORPTION OF METAL IONS

[76] Inventor: Norman B. Rainer, 2008 Fondulac Rd., Richmond, Va. 23229

[21] Appl. No.: 395,535

[22] Filed: Aug. 18, 1989

[51] Int. Cl.$^5$ ............................ C08L 1/00; C08S 5/20; C08G 63/00; C08G 63/44
[52] U.S. Cl. ........................................ 524/30; 524/36; 527/312; 525/417; 521/25
[58] Field of Search ........................ 524/36; 527/312; 525/417; 521/25

[56] References Cited

U.S. PATENT DOCUMENTS 3,715,339  2/1973  Rainer ................................. 525/417
4,332,916  6/1982  Thill ...................................... 521/25

*Primary Examiner*—John Kight, III
*Assistant Examiner*—P. Hampton-Hightower
*Attorney, Agent, or Firm*—Norman B. Rainer

[57] ABSTRACT

A product is provided comprised of an open celled sponge of regenerated cellulose containing a polyamide polymer molecularly incorporated into the cellulosic cell wall material of the sponge. The product has the capability of absorbing metal ions from dilute aqueous solutions, and is particularly well suited for the absorption of aurocyanide from a cyanide leach solution as used in gold mining operations.

4 Claims, No Drawings

PRODUCT FOR THE ABSORPTION OF METAL IONS

BACKGROUND OF THE INVENTION

This invention concerns a porous structure for abstracting dissolved metal ions from aqueous solutions, and further concerns a method for gold recovery utilizing said structure.

The use of ion exchange resins for the absorption of dissolved ions is well known. Such resins are generally manufactured in bead form and are utilized in columns through which liquids are passed to interact with the beads. The beads are generally made of cross-linked polystyrene which is then chemically modified. Two chemical modifications of such resins are prevalent, namely: a resin having sulfonic acid groups and capable of exchanging positively charged ions (cations), and a resin having quaternary ammonium groups and capable of exchanging negatively charged ions (anions). Except for their selectivity for either cations or anions, such resins do not generally distinguish between different kinds of cations or anions as may be found in multi-component solute mixtures.

A type of ion exchange resin capable of selectively removing certain ions from mixtures has been available as a chelating resin wherein the cross-linked polystyrene beads are caused to contain imino diacetic acid radicals of the formula:

$$-N(CH_2-CO_2H)_2$$

For example, a bed of such chelating resin is capable of abstracting $Cu++$ from a solution containing $Cu++$ and $Na+$. Such chelating resins, however, are limited to the absorption of metal cations capable of forming a ring structure with the carboxyl groups of the iminodiacetic acid radicals.

In the mining of gold by leaching methods, fine particles of gold become dissolved in the leach solution as anions. In particular, when sodium cyanide is employed as the active component of the leach solution, the gold is dissolved as the aurocyanide anion $Au(CN)_2^-$. In current practice, the leach solution containing dissolved gold in the form of the aurocyanide anion is treated with activated carbon in granular form. The carbon absorbs $Au(CN)_2^-$ in the presence of the high concentrations of $CN^-$. However, other metals present in the leach solution as cyanide-containing anions are indiscriminately absorbed, thereby diminishing the capacity of the carbon for gold. Among such other metals that may occur in the leach solution, silver is the most common, but copper, iron, cobalt and other metals are also encountered. The effectiveness of the carbon is nevertheless superior to anion exchange resins which would not distinguish between the large concentration of $CN^-$ and relatively low concentration of $Au(CN)_2^-$.

The granular activated carbon utilized in the recovery of gold from leach solutions must be confined by special retention means which permit contact of the granules with the leach solution, yet retain the granules. The most commonly employed retention means is a cylindrical column which holds the granules as a bed, yet permits passage of the solution undergoing treatment. Such beds of granules are susceptible to clogging by accumulation of deposits of material suspended in the leach solution.

An ion exchange resin attached to an open-celled cellulose sponge is described in U.S. Pat. No. 4,332,916. Because such product is self-supporting and of potentially large size, it can be confined in retention means other than columns, and is substantially unaffected by water-borne suspended matter. In view of its physical characteristics, it is eminently suited for the treatment of flowing natural waters where high flow volumes and high sediment levels are encountered. The ion exchange resin of U.S. Pat. No. 4,332,916 is essentially a cation exchange resin chemically bonded to the hydroxyl groups of the cellulose of the sponge by means of a cross-linking agent. One of such resins is based upon a high molecular weight polyethyleneimine (PEI) interacted with 75% by weight of the crosslinker 2-butenyl-bis [1, 4 - bis (2 hydroxyethyl) sulfonium chloride]. The very high cost of the crosslinker causes the product to be too expensive to be practical.

A chelating polymer produced by the interaction of PEI with nitrilotriacetic acid (NTA) is disclosed in U.S. Pat. No. 3,715,339. By utilizing a high ratio of NTA to PEI, the chelating polymer has a preponderance of pendant carboxyl groups which afford high affinity for multi-valent cations. Such polymers absorb water in the amount of between 100 and 600 percent of the dry weight of the resin to achieve a gel-like consistency. Accordingly, a bed of granules of such polymer presents a very high resistance to the flow of liquid therethrough. Although U.S. Pat. No. 3,715,339 discloses the disposition of the polymer within a permeable matrix such as open-celled sponge, it is implied that the polymer would occupy the cells of the sponge. As in the case of conventional ion exchange resins, absorbed ions can be eluted to permit re-cycling of the resin.

In various pollution control applications, it is sought to remove dissolved metals in the form of anions from naturally occurring flowing streams or industrial effluents. Typical species include: $CrO_4^{-2}$; $UO_2(CO_3)_3^{-4}$; $AsO_4^{-4}$; $Se_3^{-2}$; $SeO_3^{-2}$; $MoO_4^{-2}$; $SnO_3^{-2}$. The removal of such species requires a highly selective resin capable of processing a large volume of rapidly flowing water without fouling by suspended matter within the water.

It is accordingly an object of the present invention to provide a highly porous product capable of selectively absorbing anions from aqueous solution.

It is another object of this invention to provide a product as in the foregoing object having high selectivity for gold in a leach solution which contains gold in an anionic form, especially the aurocyanide anion.

It is a further object of the present invention to provide a product of the aforesaid nature capable of recycling through absorption and elution cycles.

It is a still further object of this invention to provide a product of the aforesaid nature which provides little impedence to the flow of water therethrough, and is relatively unaffected by the presence of suspended matter in said water.

It is yet another object of the present invention to provide a product of the aforesaid nature in the form of an open-celled sponge of controllable size and amenable to low cost manufacture.

These objects and other objects and advantages of the invention will be apparent from the following description.

SUMMARY OF THE INVENTION

The above and other beneficial objects and advantages are accomplished in accordance with the present invention by an open-celled cellulose sponge whose cellulosic cell wall structure contains a polyamide polymer produced by the interaction of PEI with a nitrilo compound selected from the group consisting of NTA and the salts and lower alkyl-esters of NTA.

The invention is based in part on the discovery that, when a dry cellulose sponge is impregnated with an aqueous precursor solution containing PEI and said nitrilo compound, and the impregnated sponge is dried and further heated to amide-forming temperatures, a water-insoluble polymer forms which is durably incorporated into the cellulosic cell wall structure. Although the exact mechanism of the retention of polymer by the cellulose is not known, it is felt that, rather than being chemically bonded to the hydroxyl groups of the cellulose, the polymer is molecularly entangled with the cellulose molecules. Such entangling effect obviates the need for an expensive crosslinker which would couple the polymer to the hydroxyl groups by direct chemical bonding.

It has also been discovered that, when the ratio of NTA to PEI is lower than the preferred range disclosed in U.S. Pat. No. 3,715,339, the polymer has an affinity for certain anion species. The polymer component of the product of the present invention is a water insoluble polyamide formed by the condensation polymerization of NTA, having the formula: $N(CH_2CO_2H)_3$, with PEI, having the general formula: $H[-N-CH_2-CH_2-]_n-NH_2$. The carboxyl groups of the NTA interact with primary and secondary amino nitrogens of the PEI to split out a molecule of water and establish a covalent amide bond. The polymerization reaction occurs in the temperature range of about 120 degrees to 165 degrees centigrade. Provision should be made for removal of the water formed in the condensation polymerization reaction.

DESCRIPTION OF THE PREFERRED EMBODIMENT

The PEI may have a molecular weight between about 1200 and 40,000. PEI in the lower range of said molecular weight is generally preferred because the resultant polyamide polymer appears to be more intimately bound to the cellulosic wall structure of the sponge. The PEI in general is a branched polymer comprising primary, secondary and tertiary amino nitrogens separated by ethylene groups of the formula $-CH_2-CH_2-$.

The ratio of the NTA to PEI is preferably such that the three carboxyl groups of the NTA are exposed to a stoichiometric number of primary and secondary amine groups of the PEI. On a weight basis, the ratio of NTA to PEI is preferably between 1.00 and 1.45. In preparation for formation of the polyamide polymer, a precursor solution is formed from NTA, PEI and water. The solids content of the solution is preferably in the range of 20% to 50%. Solutions more dilute than 20% generally do not impart sufficient polymer add-on to the cellulose sponge. Solutions more concentrated than 50% become viscous and do not adequately penetrate the cellulosic structure to achieve molecular entanglement. The aforementioned solutions will have pH values between about 7.8 for the 1.00 ratio solution, and about 4.9 for the 1.45 ratio solution.

In the process of producing the product of this invention the aforesaid precursor solution is applied to an open-celled sponge whose cell wall material is comprised of regenerated cellulose. A typical suitable sponge is one having been manufactured by the heat treatment of a confined mixture of granular sodium sulfate decahydrate and green viscose. Such heat treatment coagulates and regenerates the cellulose while also melting away the sodium sulfate. One variety of suitable sponge is marketed by the O Cello Sponge Company of Tonawanda, N.Y.

The sponge preferably contains a moisture content below 10% at the instant of its contact with the precursor solution. The sponge is preferably saturated with the precursor solution and then squeezed to remove excess. The thus treated sponge will typically contain an amount of solution between about 80% and 120% of its starting dry weight.

The sponge containing the precursor solution is then heated at temperatures in the range of 130 degrees C. to 165 degrees C. In the initial stages of such heating, the water utilized for making the precursor solution is driven off to produce a dry sponge. After the dry stage is reached, further heating for durations of 30 to 60 minutes causes polymerization of the NTA/PEI mixture in situ within the cellulosic material of the sponge. The pores of the sponge remain unoccluded. Following polymer formation, the sponge may be subjected to a water wash to remove any traces of unreacted chemicals.

The polyamide polymer produced as described hereinabove absorbs water to the extent of between about 130% and 400% of its dry weight. The water absorption characteristic of the polyamide polymer is best measured by creating the polymer separately from the sponge, and measuring its water-absorption propensity. Accordingly, a quantity of the precursor solution may be placed in a beaker and heated under the same conditions of time, temperature and air circulation as employed to make the sponge product. In such manner, the polyamide polymer is obtained as a clear bubbled amber-colored brittle substance. When water is added, the bubbled shape disintegrates by descrepitation to form water-swollen granules. A quantity of the water-swollen granules is placed on a blotter to remove excess water. A weighed quantity of the blotted granules is then dried at 95 degrees C. until a constant weight is achieved, thereby determining the water contained in the water-swollen granules. The water absorption characteristic provides a measure of the extent of curing or amide bond formation in the polyamide polymer. Those polymers produced by the aforesaid method having a water absorption value below 130% are too highly cross-linked to be effective in absorbing anions, whereas those polymers having a water absorption value over 400% are not durably retained by the cellulose. The water absorption level of the polymer is generally found to increase with decreasing values of the ratio NTA/PEI, and diminishes with use of higher molecular weight PEI.

The capacity of the product of this invention for absorbing ions such as aurocyanide may be measured by the K value method generally employed in characterizing the absorption capacity of activated carbons. In said method, the absorbent, in finely comminuted form, is agitated with a pH-adjusted solution of $KAu(CN)_2$. The Au content is measured by atomic absorption methods. The K value is the mg. gold/gram of absorbent when the absorbent is in equilibrium with 1 mg. gold/liter of solution. K values for coconut based activated carbons used in the recovery of gold from cyanide leach solutions generally range between about 20 and 35. K values for the sponge of this invention are greater than 20; and may range to 65.

The manner in which the polyamide polymer absorbs anions is not clearly understood, but is considered to involve the formation of coordination complex ring structures as indicated in the following formula:

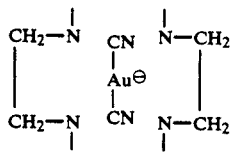

The free valences of the nitrogen atoms in the above formula may connect to other ethyleneimine groups or to an NTA group by way of an amide bond. The proper spatial configuration for formation of the coordination complex exists at a statistical number of sites of the polymer. Regardless of the actual mechanism of ion absorption, it has been discovered that the results achieved by the polymer of this invention cannot be achieved by polymers produced by the cross-linking of PEI with polyfunctional carboxylic acids closely related to NTA, such as iminodiacetic acid and ethylenediamine tetraacetic acid.

A further understanding of my invention will be had from a consideration of the following examples which illustrate certain preferred embodiments. All parts and percentages are by weight unless otherwise indicated. It is understood that the instant invention is not to be construed as being limited by said examples or by the details therein.

EXAMPLE 1

7.5 parts of nitrilotriacetic acid were mixed with 6.0 parts poly(ethylene imine) having a molecular weight of about 1800, and 19 parts deionized water at 50 degrees C. to produce a homogeneous precursor solution having a pH of 6.8.

An open-celled sponge of regenerated cellulose whose dimensions are 1'×3'×5', was saturated with the precursor solution and then squeezed between rollers to produce a damp sponge having 112% pick-up of precursor solution. The damp sponge was heated at 110 degrees C. until dry. The dry sponge was then heated at 155 degrees C. for 35 minutes. The resultant sponge, having a polymer add-on of 43% was washed with water adjusted to pH 7.2 with NaOH. A sample of the precursor solution, subjected to the same thermal treatment in a beaker produce a granular polymer having a water absorption capacity of 215%.

K values of the treated sponge were determined using solutions of sodium aurocyanide of 1 mg Au/liter and pH-adjusted with NaOH. The solutions were circulated for 24 hours through a piece of the sponge held in a treatment column. The aurocyanide solutions were analyzed by atomic absorption before and after contact with the sponge sample. The following results were obtained:

| pH of test solution | K value* |
|---|---|
| 6.5** | 67 |
| 7.1 | 58 |
| 7.7 | 54 |
| 8.2 | 49 |
| 8.8 | 44 |
| 9.2 | 38 |
| 10.1 | 33 |
| 10.5 | 29 |
| 11.3 | 18 |

*mg Au absorbed/dry gram of treated sponge
**adjusted with HCl

As the data indicate, the sponge product is effective in the pH range of about 6.5 to 10.5 for absorption of gold. At higher pH levels, its efficiency for gold absorption is sharply diminished. It is interesting to note that, at pH 6.5, the gold content of the test solution is probably in the form of $Au^{+++}$. This indicates that the sponge product can also absorb cation forms of multivalent metals.

EXAMPLE 2

The fabrication method of Example 1 was repeated using various ratios of NTA/PEI. The following results were obtained using a sodium aurocyanide solution having a pH of 7.5, and testing in the same manner as in Example 1:

| NTA/PEI | K value* |
|---|---|
| 0.95 | 15 |
| 1.00 | 42 |
| 1.05 | 60 |
| 1.25 | 55 |
| 1.35 | 49 |
| 1.45 | 35 |
| 1.50 | 17 |

As the data indicate, the preferred values of the NTA/PEI ratio are between 1.00 and 1.45. A similar distribution of K values may be observed with aurocyanide solutions of different pH within the preferred pH range.

EXAMPLE 3

A specimen of the sponge product of Example 1, saturated with gold, was cut into small pieces which were placed in a glass column and subjected to an elution treatment employing a modified Zadra process (Zadra, J. B., Engle, A. L. and Heinen, H. S. "Process for Recovering Gold and Silver From Activated Carbon by Leaching and Electrolysis" U.S. Bureau of Mines, R.I. 4843, 1952.)

The treatment employed an aqueous solution of 1% NaOH and 0.5% NaCN at a temperature of 30 degrees C. The solution was circulated through the sponge for six hours. It was found that 89% of the gold was thereby removed from the sponge.

The sponge was washed with water and re-employed in the absorption of gold from an aurocyanide test solution at pH 7.1. The newly found K value was 53, which represents a slight loss in capacity in comparison to the K value of 58 for the original sponge product.

EXAMPLE 4

Example 1 was repeated employing the ammonium salt of NTA instead of NTA. Ammonia was evolved during the drying and amide-forming heat cycles. The resultant sponge product exhibited a K value of 57 at a pH of 7.7.

EXAMPLE 5

Example 1 was repeated employing PEI samples of 5 different molecular weight. The resultant treated sponges were tested with an auocyanide solution having a pH of 8.2. The following results were obtained:

| PEI Molecular Weight | K Value |
|---|---|
| 1,200 | 51 |
| 10,000 | 43 |
| 40,000 | 37 |
| 60,000 | 19 |

As the data suggest, the capacity of the sponge for gold, as evidenced by the K value, diminishes as the molecular weight of the PEI increases. The preferred product of the present invention, having a K value above 20, is made from PEI having a molecular weight between 1,200 and 40,000. One reason for the molecular weight effect is that, as the molecular weight of the PEI increases, the viscosity of the precursor solution increases. This thwarts molecular penetration of the precursor ingredients into the cellulose.

EXAMPLE 6

Example 1 was repeated with the exception that the polymer add-on was varied by modifying the concentration of the precursor solution and the extent of squeezing out of the precursor solution from the sponge prior to heat treatment.

The resultant heated sponge products were subjected to miscroscopic examination at 30X magnification to ascertain whether polymer is distinguishable as a separate solid phase. The sponges were also subjected to kneading while immersed in water, and subsequently tested for decrease of K value. The following results were obtained:

| % Add-on of Polymer | % Decrease in K Value* | Polymer Discerned at 30 X |
|---|---|---|
| 23 | 4 | none |
| 36 | 8 | none |
| 43 | 11 | none |
| 55 | 14 | slight |
| 63 | 22 | significant |

*based upon K value determination before and after kneading the sponge while immersed in water.

The above data indicate that, at add-on levels of less than 55%, the polymer is substantially molecularly incorporated within the cellulose. At higher add-on levels, the polymer accumulates as a separate phase on the cellulose and is susceptible to being removed during use in actual ion recovery operations.

EXAMPLE 7

The sponge product of Example 1 is cut into pieces of about 5 mm cubes, and the cubes are loaded into a glass column of 2.5' inside diameter. A solution containing the anionic cyanide complexes of Cu, Au, Ag, Pt and Pd, each at a concentration of 1 mg metal/liter, was slowly passed downwardly through the bed of cubes. The affinity of the cubes for the several ions was determined by analyzing the bed at different levels, the most strongly absorbed ion being at the top of the bed. By such general technique, the following order of affinity was established:

$$Cu > Pd > Pt > Au >> Ag.$$

In similar tests conducted on bicomponent mixtures of Au and Ag cyanide anions, it was found that Ag would not be absorbed until it was present in the solution at a level about 4 times greater than Au. Accordingly, it may be said that the product of this invention has a four fold greater affinity for Au than for Ag.

It is to be appreciated that, in the case of the preferred embodiment wherein the polyamide is produced from NTA and PEI, the precursor solution is essentially an aqueous solution of a polyfunctional amine salt of a carboxylic acid. It is likely that the very high charge density characteristic of the salt is in part responsible for the penetration of the molecular structure of the cellulose.

The cellulose sponge is a very critically selected porous substrate for the polyamide polymer, the primary reason being that the cellulose sponge is capable of swelling greatly in volume when its dry form absorbs water. Such swelling upon wetting is comparable to the large amount of swelling that the dry polyamide undergoes when it absorbs water. It has in fact been discovered that, when the polyamide of this invention is generated within rigid porous substrates such as ceramics, silica gel, alumina granules, plaster of paris, pumice and perlite, the substrate disintegrates when contacted by water because of the strong expansive force of the polymer.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

What is claimed is:

1. An open celled sponge product comprised of regenerated cellulose wall material and a water insoluble polyamide durably associated with said cell wall material and having a water absorption capacity between about 130% and 400%, said polyamide having been produced from an aqueous solution comprised of nitrilotriacetic acid and polyethyleneimine having a molecular weight between 1200 and 40,000, the weight ratio of nitrilotriacetic acid/polyethyleneimine being between 1.00 and 1.45, said solution having been impregnated into an open celled cellulosic sponge which is then heated at a temperature in the range of 130 degrees C. to 165 degrees C. for sufficient time to produce said polyamide.

2. The product of claim 1 wherein said polyamide represents an add-on of between about 20% and 50% of the weight of said cellulose.

3. The sponge of claim 1 having a K value greater than 20 for the absorption of aurocyanide anion.

4. A process for the recovery of gold from a leach solution containing gold in ionic form comprising contacting said solution at pH values between 6 and 10.5 with the sponge of claim 1.

* * * * *

UNITED STATES PATENT AND TRADEMARK OFFICE
CERTIFICATE OF CORRECTION

PATENT NO.   : 5,002,984
DATED        : March 26, 1991
INVENTOR(S)  : Norman B. Rainer It is certified that error appears in the above—identified patent and that said Letters Patent is hereby corrected as shown below:

Column 4, lines 14-18, the formula should appear as follows:

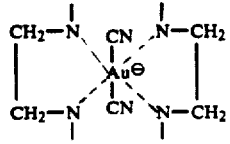

At Column 4, lines 43, make "descrepitation" read --decrepitation--.

At Column 5, line 49, make "1'x3'x5' " read --1"x3"x5"-- .

At Column 7, line 61, make "2.5' " read --2.5"-- .

Signed and Sealed this

Twenty-seventh Day of October, 1992

Attest:

DOUGLAS B. COMER

*Attesting Officer*   Acting Commissioner of Patents and Trademarks